UNITED STATES PATENT OFFICE.

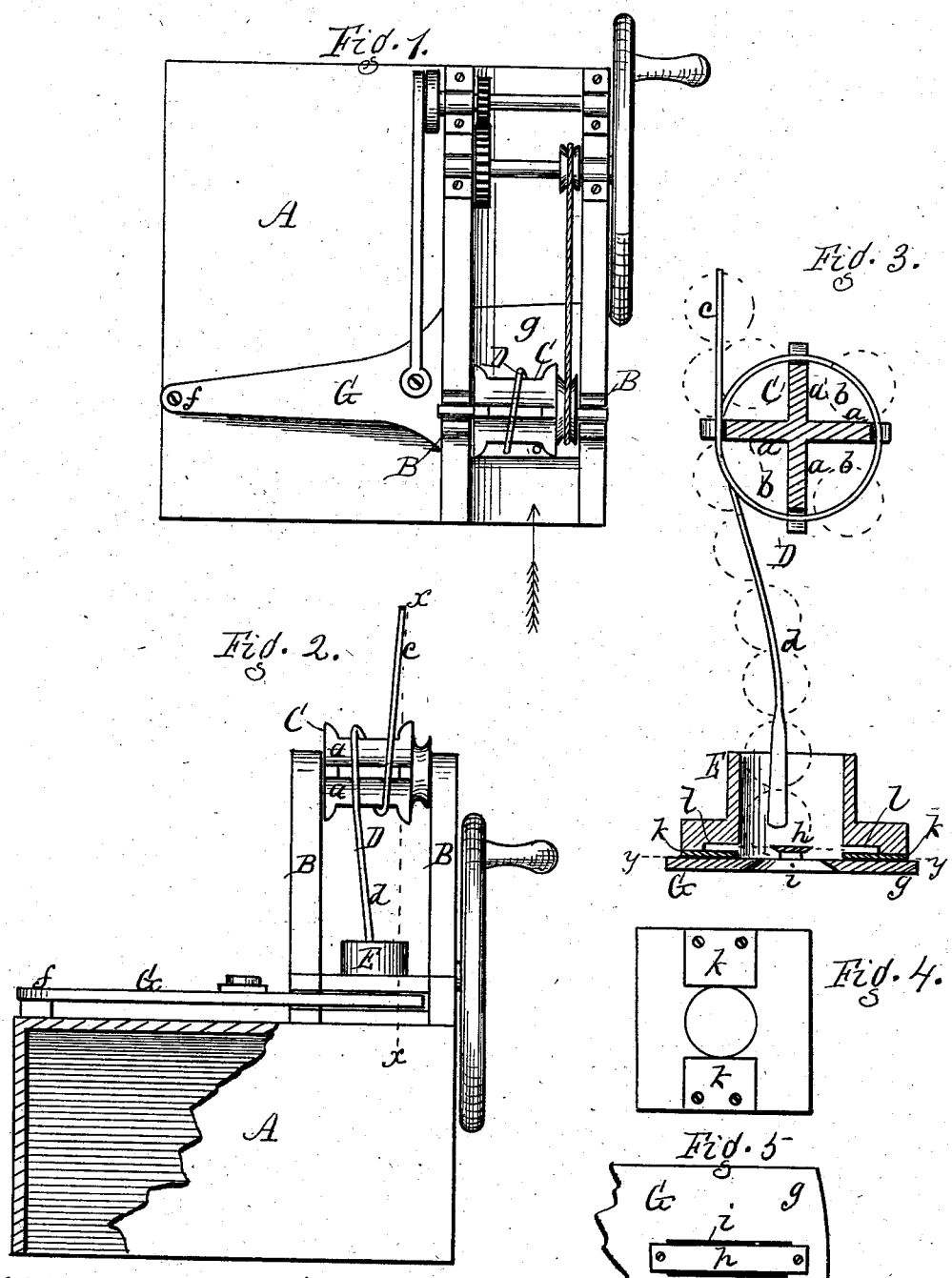

FRANK H. TRUMBULL, OF MARION, NEW YORK, ASSIGNOR OF EIGHT-TWELFTHS TO LORENZO R. POTTER, LEWIS SMITH, AND STEPHEN TRUMBULL, OF SAME PLACE.

FRUIT-SLICING MACHINE.

SPECIFICATION forming part of Letters Patent No. 259,949, dated June 20, 1882.

Application filed February 20, 1880.

*To all whom it may concern:*

Be it known that I, FRANK H. TRUMBULL, a citizen of the United States, residing at Marion, Wayne county, New York, have invented a certain new and useful Improvement in Fruit-Slicers; and I do hereby declare that the following is a full, clear, and exact description of the same, reference being had to the accompanying drawings, in which—

Figure 1 is a plan of the machine. Fig. 2 is an elevation looking in the direction indicated by the arrow in Fig. 1. Fig. 3 is a vertical cross-section in line $x\,x$ of Fig. 2. Fig. 4 is a bottom view of the hopper, looking upward from line $y\,y$ of Fig. 3. Fig. 5 is a plan of the knife.

This improvement relates to apparatus for slicing apples and other fruits after they have been pared and cored.

The invention consists in an improved means for feeding the fruit automatically to the knife, hereinafter more fully described.

A represents an inverted box or chamber, which forms the frame for supporting the working parts, and also a bleaching-chamber, in which the fruit is bleached after it has been sliced.

B B are two standards, which rise from the box; and C is a reel having its journals resting in the top of the standards, so that it can revolve freely. This reel consists of wings $a\,a$, which meet radially and form angular spaces $b\,b$ between the wings, as shown most clearly in the cross-section, Fig. 3.

Around the reel rests loosely a wire rod, D, which makes a full coil, the upper end, $c$, projecting up straight above the reel, and the lower end, $d$, projecting downward and hanging loosely in the open-topped hopper E. The reel simply turns loosely in the coil of the wire, the latter at all times retaining the position shown.

The apples, when pared and cored, have a hole through the center. They are placed one after another upon the upper projecting end, $c$, of the wire, and as the reel revolves within the coil of the wire the apples fall into the angular spaces $b$ and are carried around, sliding upon the wire till finally they escape on the under side and fall down on the lower length, $d$, of the wire into the hopper. The lengths constituting the coil of the wire are arranged spirally and at some distance apart, so that the apples can pass each other on the reel. By this arrangement a great advantage is attained. Heretofore the apples have been placed one by one in the hopper, or else have been strung on a long rod hung over the hopper, so that they would feed downward; but in such case, when the supply was exhausted, the rod had to be removed and refilled. By the arrangement above described the apples can be fed continuously on the wire D and be carried to the hopper without intermission. The tenderest fruit can be carried around the reel without being broken.

G is an arm or plate pivoted at $f$ and having a wide flat head, $g$, which plays back and forth beneath the hopper. On its top is a knife, $h$, raised some distance above the surface and resting on blocks or bearings at the ends. Beneath the knife is a throat, $i$, for the escape of the sliced fruit. The distance between the top of the plate G and the raised knife is equal to the desired thickness of the slice.

On the under side of the hopper, and above the plate G, are two cheeks, $k\,k$, having slots $l\,l$ above them in line with the knife and into which the knife strikes at each stroke. These slots are wide enough to receive the whole width of the knife, so that when the knife enters the same it passes entirely clear of the fruit. The knife cuts in both directions, so that very rapid work is done. The reciprocating plate G not only forms the support for the knife, but also the bed to gage the thickness of the slice. The knife might be made stationary and the hopper to reciprocate, but would not be so effective as the arrangement above described.

The lower end of the wire D hangs loose in the hopper, so that the fruit strung thereon may be pressed from one side to the other to find a bearing as the knife strikes it. The lower end of the wire is also enlarged in tapering or conical form, so that as the apple reaches the lower end, where it meets the knife, it will be held tightly to the rod and have no loose action. By this means the slicing is more regular and uniform and there is less danger of breaking the apple or the slices.

The apparatus may be driven by any suitable means, but preferably by a treadle attached to the side of the box, so that a single operator can run the machine by his foot and feed the apples on the wire by hand.

This machine may also be used to slice vegetables and roots.

Having thus described my invention, what I claim as new, and desire to secure by Letters Patent, is—

1. In a fruit-slicer, the combination of the reel and the wire, the wire being coiled loosely around the reel and allowing the reel to rotate freely therein, the ends of the wire projecting above and below, and the whole serving to allow automatic feeding of the fruit to the knife, as specified.

2. In a fruit-slicer, the wire D, resting upon the reel C and having its lower end enlarged in tapering or conical form, largest at the bottom, as and for the purpose specified.

In witness whereof I have hereunto signed my name in the presence of two subscribing witnesses.

FRANK H. TRUMBULL.

Witnesses:
O. H. SANFORD,
WILLIAM SEE.